May 3, 1960     H. E. GOLDBERG     2,934,992
REFRACTOMETER
Filed April 8, 1955     2 Sheets-Sheet 1
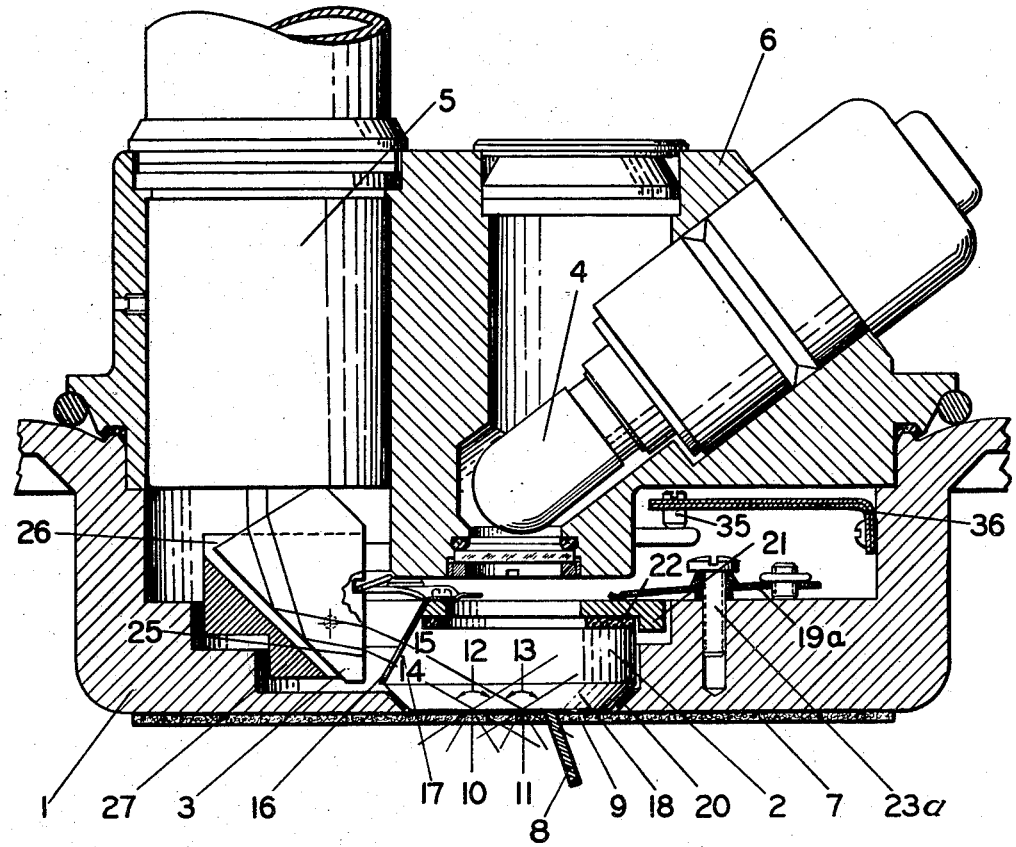
FIG. 1
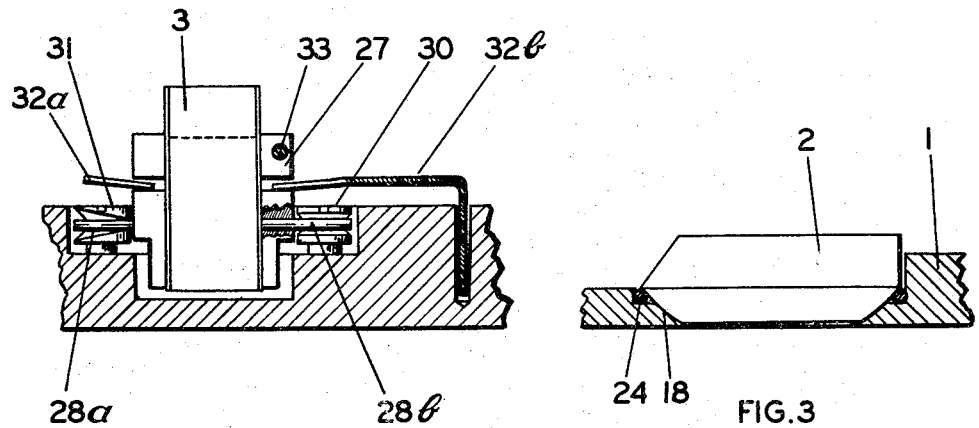
SECTION A-A
FIG. 4
FIG. 3
INVENTOR.
Hubert E. Goldberg

United States Patent Office 2,934,992
Patented May 3, 1960

2,934,992

REFRACTOMETER

Herbert E. Goldberg, Tariffville, Conn.

Application April 8, 1955, Serial No. 500,100

3 Claims. (Cl. 88—14)

This invention relates to refractometers of the critical angle type and more particularly to the kind used in the food processing and chemical industries for the control of plant operations. All refractometers presently known follow the classical design which makes use of a relatively large prism of rectangular cross section and depends on a cemented joint to seal the prism to the refractometer casing. Because of this construction, all these instruments are easily damaged by sudden changes of operating temperatures and they do not withstand high temperatures at which chemical processes often proceed. This restricts their field of application very greatly.

It is the objective of the present invention to provide a refractometer design suitable for continuous operation at high temperatures and because of its great resistance to thermal shock, over a wide temperature range.

More particularly the invention provides a new optical layout using a small main prism of a shape designed to minimize strain resulting from thermal gradients. It further provides ways of mounting the main prism and the compensating prism which minimize the optical and mechanical effects of possible distortion of the refractometer casing by thermal expansion.

Lastly the invention discloses a simple and automatic method of temperature compensation assuring correct readings over the extended temperature range for which the instrument is suitable.

The invention is illustrated, by way of example only, in the attached drawings, in which:

Figure 1 is an axial section of a process refractometer intended for use on a chemical reaction vessel.

Figure 3 is a cross sectional view showing an alternate way of holding a refractometer prism in a casing.

Figure 4 is a cross sectional view in elevation showing the compensating prism in its holder.

Figure 2:
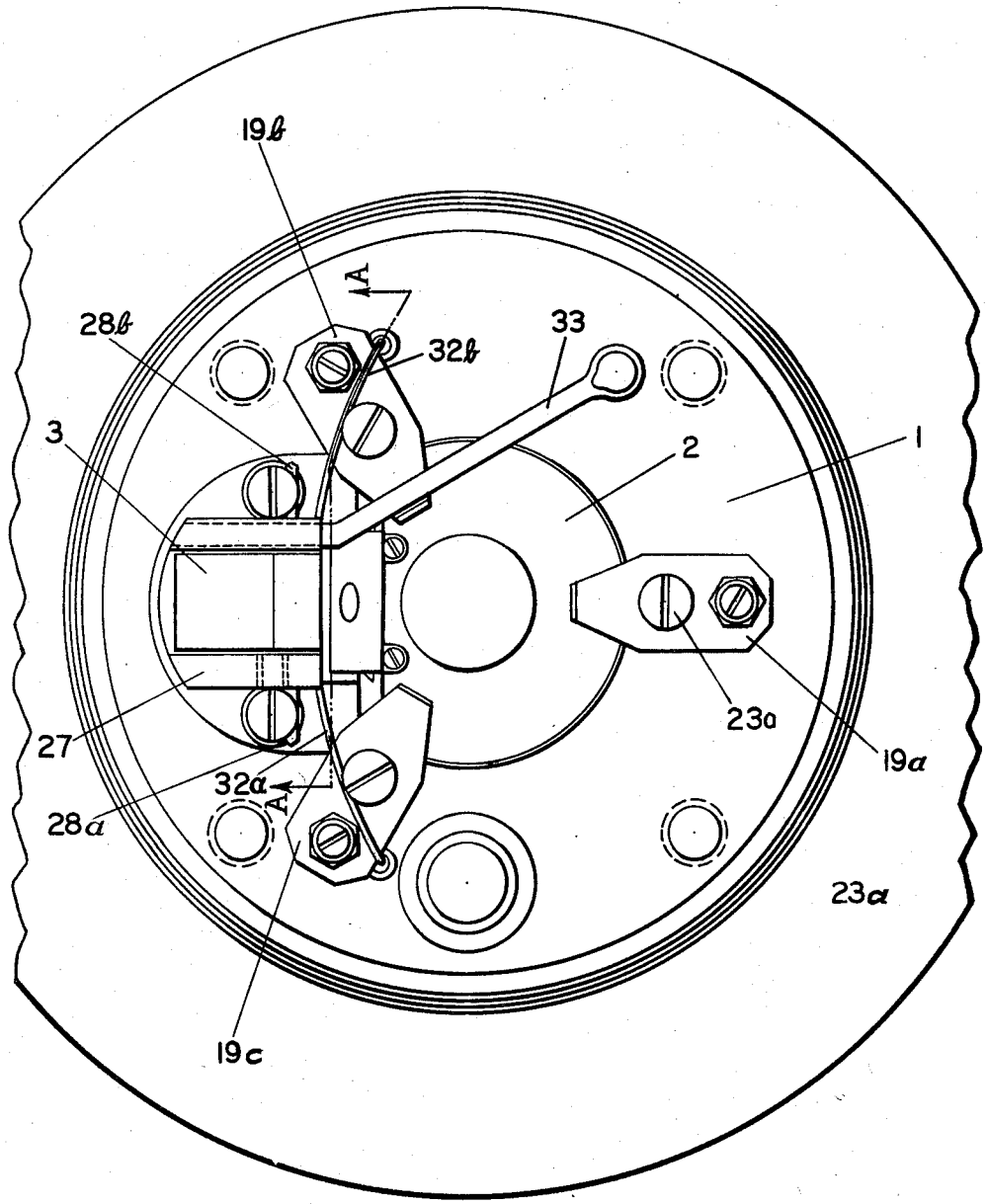
Figure 2 is a plane view of the refractometer casing showing the main and the compensating prisms in their mounts.

The well known principle of operation of a critical angle refractometer is illustrated in Figure 1 where 1 is the main casing of such a refractometer holding the main prism 2 and the compensating prism 3. A light source 4 and a telescope 5 are located in the top casting 6. The telescope 5 comprises the usual optical elements and a scale not shown in the drawings.

Light emitted by lamp 4 enters the substance to be measured 7 after first passing through the prism 2. This light beam is then diffusely reflected by the substance 7 or by a diffusing plate 8 and a portion of this light re-enters the prism 2 through interface 9. Upon refraction at the interface 9 bundles 10 and 11 of diffused light are transformed into a series of cones of light 12 and 13 of definite aperture. The limiting rays 14 and 15 of these cones after passing through the compensating prism 3 and the telescope 5 form the well known boundary line of the shadow in the field of view of the refractometer. For highest resistance to thermal shock, the main prism must be as small as possible. The present invention achieves this by locating the aperture stop 16 of the optical system near the exit face 17 of the prism 2 rather than in the telescope objective as heretofore customary. Furthermore, minimum strain for a given stress is achieved by giving the prism 2 a cylindrical rather than the usual rectangular cross section. The small flat exit face 17 is ground into the wall of the cylinder at the suitable angle. A flat or spherical bevel 18 is provided on one or both faces of the prism 2 in order to approximate still further a spherical shape which would be the most favorable form from the point of view of stress relief.

Strain on the prism 2 is held to a minimum by a special semi-kinematic mount. Three flat springs 19-a, b and c press the prism 2 against a thin ring 20 of synthetic rubber. These springs are pre-stressed before assembly and when tightened down by screws 23-a, b and c produce a definite pressure on the prism through an equalizing ring 21 and a resilient pad 22.

This method of holding the main prism 2 produces a vacuum tight seal between prism 2 and the refractometer casing 1 and also allows for free expansion or contraction of prism and casing under changes of operating temperature.

Figure 3 shows a variation of this design where the flat ring 20 has been replaced by an O-ring 24. This provides for direct contact between prism bevel 18 and refractometer casing 1 and is useful where a very accurate location of the prism in the casing is important.

Referring again to Figures 1 and 2 the compensating prism 3 deflects the light beam into the telescope 5 and through its refracting faces 25 and 26 introduces a color dispersion effect exactly opposite to that produced by the refraction on the interface 9 of main prism 2.

As shown in Figures 2 and 4 the compensating prism 3 is also held in a semi-kinematic mount which consists of the mounting block 27, a pair of pins, 28-a and b, a grooved screw 30, an eccentrically grooved screw 31, two wire springs 32-a and b, and a restraining lever 33. The springs 32-a and 32-b urge pins 28-a and 28-b into adjustable bearings formed by the grooved screws 30 and 31. These springs also tend to rotate the mounting block 27 about the axis formed by pins 28-a and 28-b and thus force the restraining lever 33 against the stop screw 35 as shown in Figure 1. Any motion of the stop screw 35 causes a displacement of the shadow line in the field of view of the refractometer and consequently a change of refractometer reading.

The stop screw 35 may be fastened to a bi-metallic element 36 of such characteristics that the motion of stop screw 35 under the influence of temperature changes will compensate for temperature variation of the refractive index of the substance to be measured. The refractometer then will automatically produce correct readings of sample characteristics over the wide temperature range for which the mechanism provided by the invention has been designed.

Having thus described my invention, what I claim is new and desire to secure by Letters Patent is:

1. In a refractometer having a casing with a light receiving face, a substantially circular opening within said face, a main refractometer prism with a substantially circular entrance face, said light receiving face and said entrance face adapted to contact a substance to be measured and admitting light from said substance, said main prism having a bevel surrounding said entrance face and being located in said opening and being oriented parallel with said light receiving face of said casing, a substantially circular sealing gasket between said opening and said bevel of said main prism, spring means within said casing for urging said bevel of said main prism yieldably against said gasket and through it against said opening to establish a tangential type of contact between said prism and said gasket so as to prevent said substance to be measured from entering said casing and so as to relieve said main refractometer prism from thermal stress.

2. In a refractometer a casing having a light receiving face with an opening therein, said casing carrying an optical system including a main refractometer prism having an entrance face, said entrance face being located within said opening, an adjustable reflecting member positioned for receiving light from said main refractometer prism and for directing light to a viewing area, means for adjustably holding said reflecting member within said casing, said means including a holder and at least one bearing member located on said casing and providing pivotal movement of said reflecting member with respect to said casing, an adjustable stop screw contacting said holder for adjusting the angular position of said reflecting member with respect to said casing and thereby providing for adjustment of the refractometer reading in said viewing area.

3. In a refractometer according to claim 2 a temperature responsive adjustment member mounted on said casing and carrying said stop screw, said temperature responsive adjustment member and stop screw cooperating to exert a temperature responsive pressure on said holder for the purpose of adjusting the refractometer reading in accordance with temperature changes.

References Cited in the file of this patent

UNITED STATES PATENTS

| | | |
|---|---|---|
| 1,111,093 | Preddey | Sept. 22, 1914 |
| 1,571,066 | Schulz | Jan. 26, 1926 |
| 2,373,610 | Stegeman | Apr. 10, 1945 |
| 2,601,128 | Rosenthal et al. | June 17, 1952 |
| 2,624,014 | Barstow | Dec. 30, 1952 |
| 2,768,553 | Goldberg et al. | Oct. 30, 1956 |

FOREIGN PATENTS

| | | |
|---|---|---|
| 690,268 | Great Britain | Apr. 15, 1953 |